Nov. 2, 1926.　　　　　　　　　　　　　　　　　　　　1,605,560
R. H. PLASS
AUTOMATIC MACHINE FOR MANUFACTURING POULTICES
Filed Feb. 4, 1925　　　　8 Sheets-Sheet 1

WITNESSES

INVENTOR
ROBERT H. PLASS
BY
Knight Bray
ATTORNEYS

Nov. 2, 1926.

R. H. PLASS 1,605,560

AUTOMATIC MACHINE FOR MANUFACTURING POULTICES

Filed Feb. 4, 1925   8 Sheets-Sheet 2

WITNESSES

INVENTOR
ROBERT H. PLASS
BY
ATTORNEYS

Nov. 2, 1926.
R. H. PLASS
1,605,560
AUTOMATIC MACHINE FOR MANUFACTURING POULTICES
Filed Feb. 4, 1925
8 Sheets-Sheet 3

WITNESSES

INVENTOR
ROBERT H. PLASS
BY

ATTORNEYS

Nov. 2, 1926.

R. H. PLASS 1,605,560

AUTOMATIC MACHINE FOR MANUFACTURING POULTICES

Filed Feb. 4, 1925    8 Sheets-Sheet 4

WITNESSES

INVENTOR
ROBERT H. PLASS
BY
ATTORNEYS

Nov. 2, 1926.  1,605,560
R. H. PLASS
AUTOMATIC MACHINE FOR MANUFACTURING POULTICES
Filed Feb. 4, 1925   8 Sheets-Sheet 6

WITNESSES

INVENTOR
ROBERT H. PLASS
BY
ATTORNEYS

Nov. 2, 1926.

R. H. PLASS 1,605,560

AUTOMATIC MACHINE FOR MANUFACTURING POULTICES

Filed Feb. 4, 1925

WITNESSES

INVENTOR
ROBERT H. PLASS
BY
ATTORNEYS

Nov. 2, 1926.

R. H. PLASS 1,605,560

AUTOMATIC MACHINE FOR MANUFACTURING POULTICES

Filed Feb. 4, 1925       8 Sheets-Sheet 8

INVENTOR
ROBERT H. PLASS
BY
Knight Bro.
ATTORNEYS

Patented Nov. 2, 1926.

1,605,560

UNITED STATES PATENT OFFICE.

ROBERT H. PLASS, OF UPPER MONTCLAIR, NEW JERSEY, ASSIGNOR TO POLORIS COMPANY, INC., OF NEW YORK, N. Y., A CORPORATION OF NEW YORK.

AUTOMATIC MACHINE FOR MANUFACTURING POULTICES.

Application filed February 4, 1925. Serial No. 6,765.

This invention relates to machines for making dental poultices or the like and has for its object to provide an improved construction and arrangement of parts in a machine of this character whereby a wrapped filler may be continuously formed, successive short sections severed therefrom, closed at their severed ends and arranged in suitable order to be made up into packages.

The machine for making and packaging dental poultices which is shown on the drawings and described in the specification, constitutes an adaptation of the principles underlying my invention as expressed in the claims. Contemplated in this adaptation are mechanisms for mixing and charging the poultice filling materials; for feeding the continuous stock or filled wrapper as it is being formed and moving said stock forward; for severing successive sections therefrom and tapping the severed ends to release excess material therefrom; for closing said severed ends to complete the dental poultices; and finally for forming said poultices into groups containing predetermined numbers of poultices ready to be packaged.

Specific objects of invention will appear in the specification and be pointed out in the claims in connection with the accompanying drawings, in which—

Figure 2ª is a similar diagrammatic side elevation of the mechanism for feeding the continuous stock and severing successive sections therefrom.

Figure 3ª is a side elevation of the delivery end of said conveyer and means for charging poultices into boxes;

Mixing and charging mechanism.

According to the embodiment of my invention shown on the drawings, an upper tape roll 1 of gauze or other suitable material for wrapping a continuous filler is carried by a shaft 2, said tape as it is drawn from the roll being passed thru a curved inlet guide 3 and under an upper forming roll 4 carried by a shaft 5. A lower tape roll 6 of gauze or other suitable wrapping material is mounted upon a shaft 7 and passed thru a tubular guide 8 to a lower forming roll 9 on a shaft 10. Said rolls 4 and 9 are provided with peripheral grooves having complementary cross sections corresponding to that of a continuous stock to be formed between them. In the preferred embodiment of my invention shown on the drawings, this stock is designed for the purpose of having successive sections severed therefrom to be formed into dental poultices which are subsequently formed into unitary packages. Suitable means for supplying poultice material as a filler between the upper and lower tapes, may be provided as follows. Arranged between the tape roll shafts 2 and 7, is a housing 11 for a rotary mixing drum 12 provided with an apertured cylindrical wall 13. Extending around the cylindrical wall 13 and spaced therefrom, is a relatively fine mesh screen 14 which is enlarged toward one end and adapted to discharge such material as is not fine enough to pass therethru into a discharge chute 15. The housing 11 merges downwardly into a hopper 16 provided with a throat 17 arranged above the larger end of a tapered screw conveyer 18. Keyed to the screw conveyer 18 is a spur gear 19 whereby it may be driven for propelling the poultice material forwardly and in between the tapes 1 and 6 as they pass between the upper and lower forming rolls 8 and 9. Arranged in advance of the forming rolls 4 and 9, is the presser foot 20 of a sewing machine which is indicated on the general plan view by reference character 21 and provided with laterally spaced stitching needles 22, 22, (see Figure 1) which stitch the lateral edges of the tapes 1 and 6 together which are thus constituted as a wrapper for the compacted poultice material therebetween. Said machine may be provided with a grooved pulley 23 which may be driven from any suitable source of power (not shown). The forming rolls are preferably geared together to be driven in unison, a suitable chain of gears for this purpose being represented by the spur gear 24 shown in Figure 1. While these forming rolls may operate to some extent in feeding the tapes and filler forwardly, I prefer to provide suitable stock-feeding mechanism which imparts a continuously operating draw-off of the poultice stock but at the same time permits an intermittent movement of the forwardly presented end of the stock so that successive sections can be severed therefrom.

*Stock cutting and tapping mechanism.*

Figure 1:
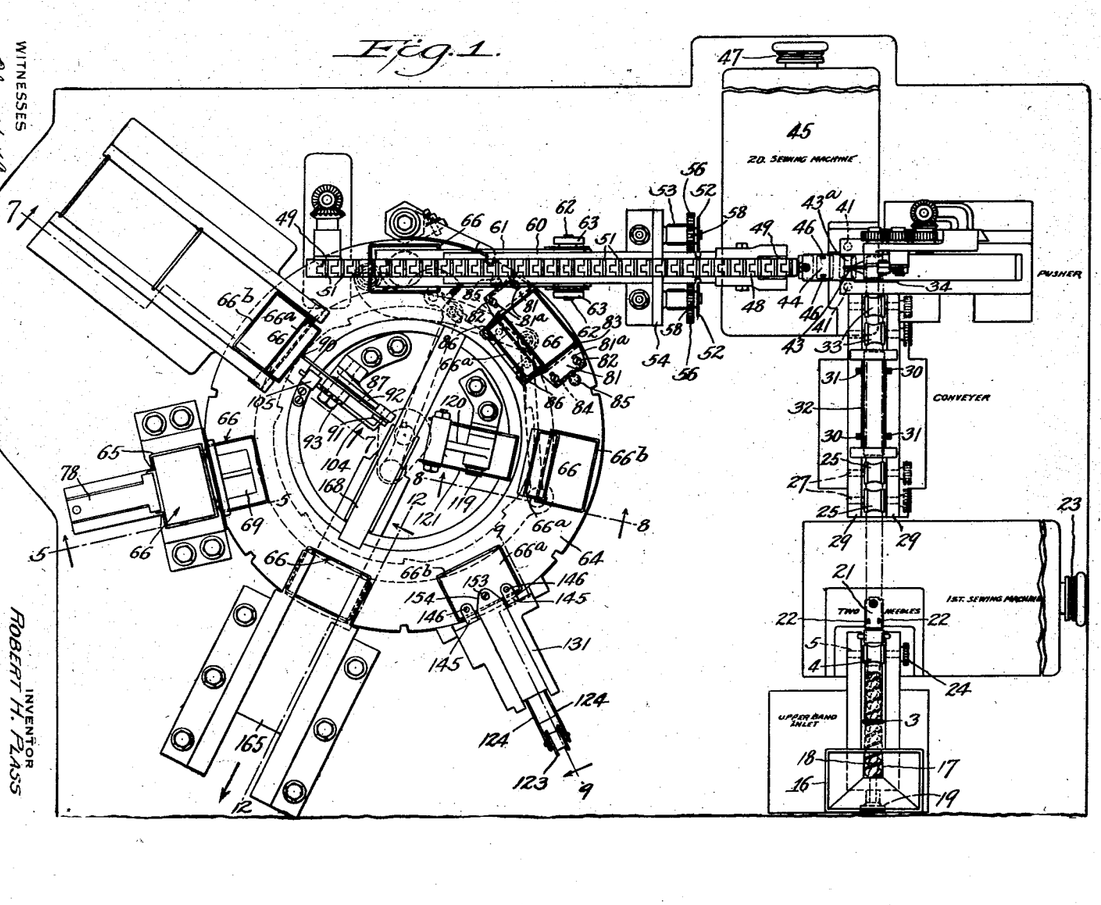
Figure 1 is a top plan view of a complete poultice making and packaging machine according to the present invention.
Figure 2:
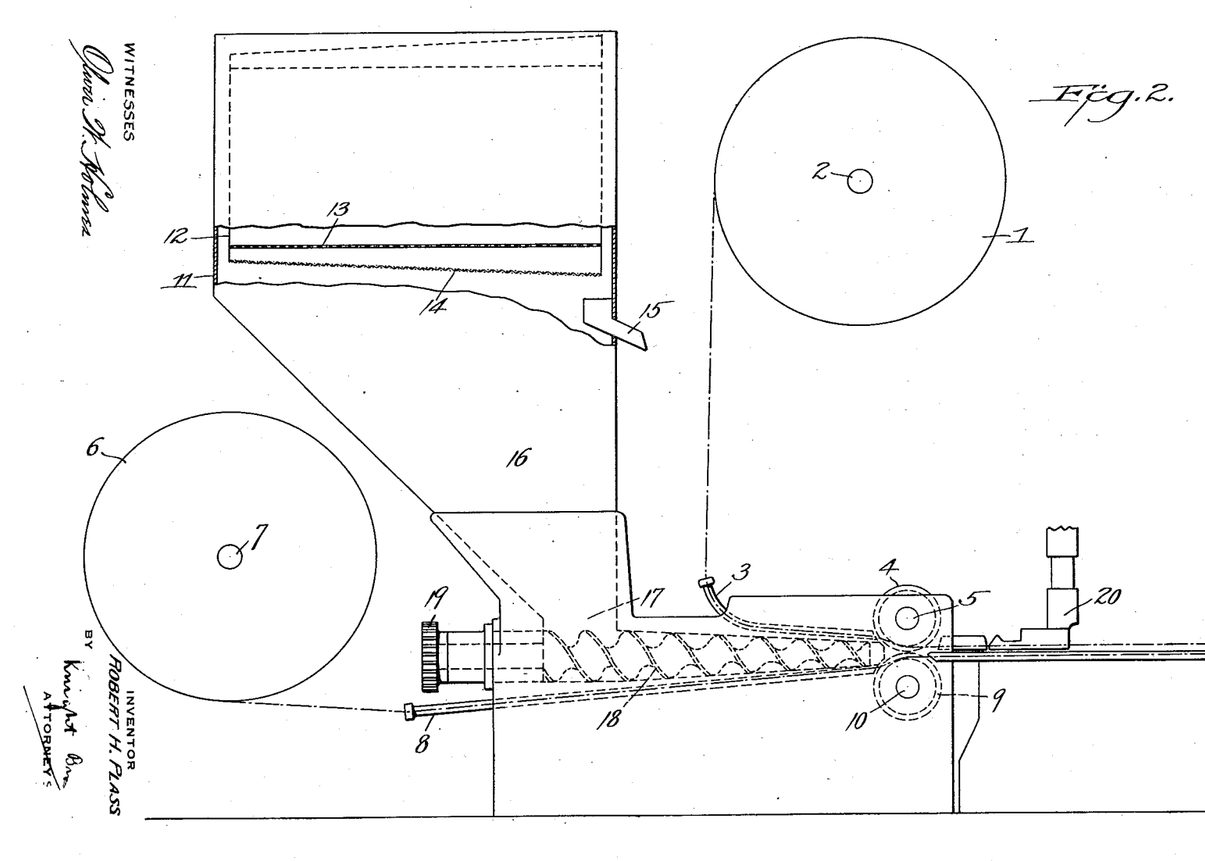
Figure 2 is a diagrammatic side elevation of the continuous stock-forming mechanism.
Figure 2A:
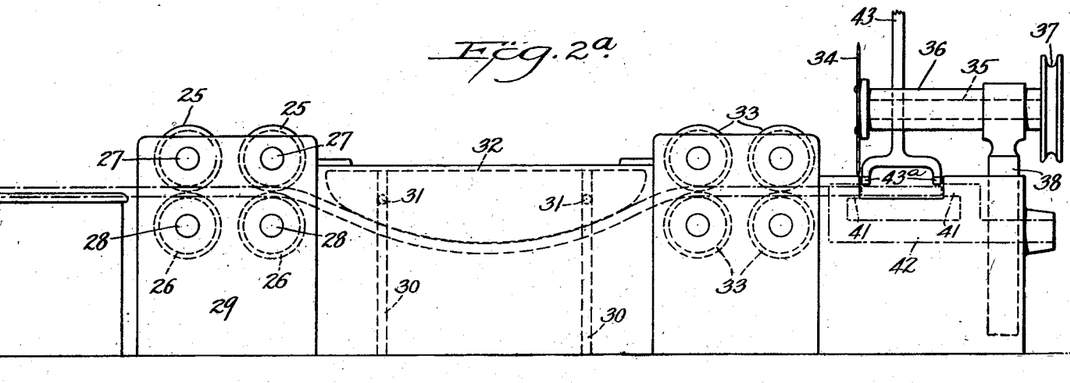

As shown in Figure 2ª which constitutes a continuation of Figure 2, the continuously operating stock-feeding mechanism includes upper and lower feed rolls 25 and 26 carried by shafts 27 and 28 journalled in side frames 29. These feed rolls are provided with grooved peripheries corresponding in transverse section to that of the continuous stock. As shown in Figures 1 and 2ª, the side frames 29, 29, in advance of the feed rolls 25, 26, are provided with vertical grooves 30, 30, within which are slidably arranged oppositely projecting pins 31, 31, on a slack take-up weight 32. Said intermittent feed rolls 33 are designed to present successive predetermined lengths of the wrapped filler to be severed from the continuous stock by a circular cutter 34.

*Mechanism for severing and tapping stock Sections.*

Figure 3:
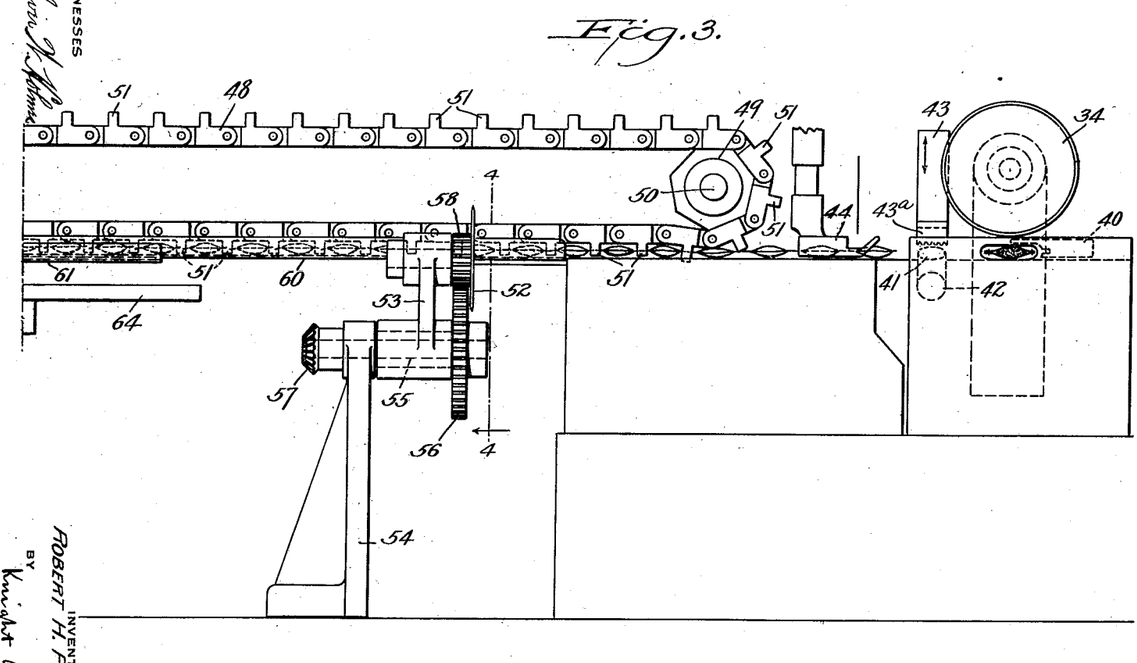
Figure 3 is a side elevation at right angles to Figure 2 and 2ª showing a portion of the packaging conveyer, poultice stitcher, and stitch cutting blades.
Figure 3A:
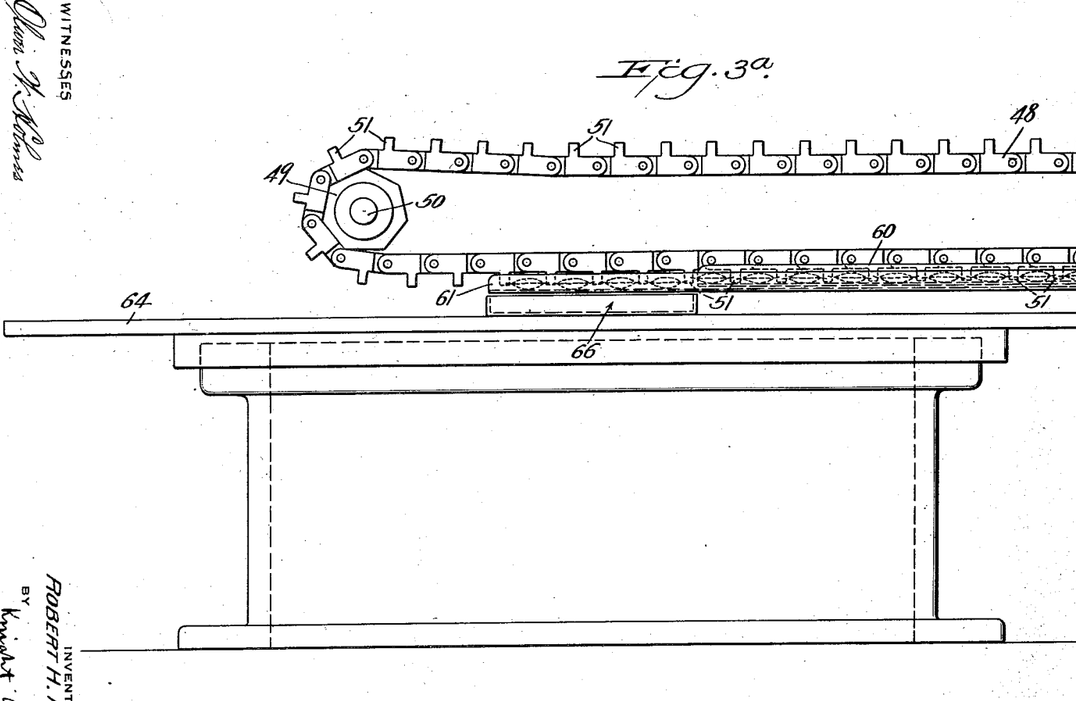
Figure 4:
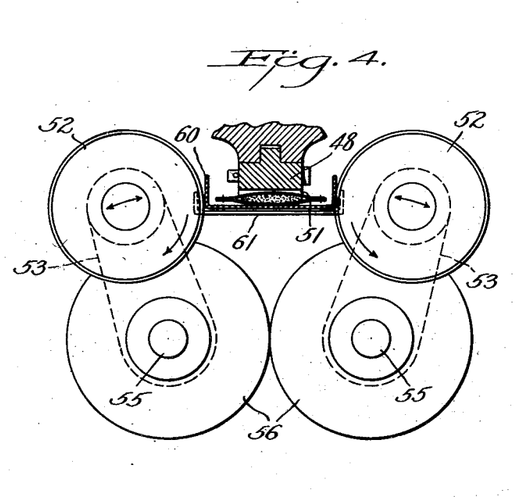
Figure 4 is a section on the line 4—4, Figure 3.

The rotary blade or cutter 34 is non-rotatably mounted upon a shaft 35 journalled in an elongated bearing 36. Said shaft 35 is provided with a grooved pulley 37 by means of which it may be driven from any suitable source of power. A vertically reciprocable slide 38 may be adapted to carry the bearing 36 which thus rises and falls at suitable intervals for cutting off successive sections from the continuous stock. As shown in Figures 2ª and 3, each successive section severed from the stock is moved by a reciprocatory pusher 40 to a position in which its oppositely presented open ends are placed in register with suitably presented port openings 41 in communication with a vacuum chamber 42. While the poultice section is held in this position by the pusher 40 a vibrator 43 provided with branches 43ª suitably spaced to tap on the ends of the poultice section, is operated to loosen the excess material which is drawn off by suction thru the port openings 41, 41. As shown in Figure 3, the pusher 40 next presents the severed section to the presser foot 44 of the second sewing machine which is indicated on the general plan view of the machine by the reference character 45. As indicated in Figure 1, the sewing machine 45 is provided with laterally spaced needle stitchers 46 and is driven by a suitable grooved pulley 47. As the laterally spaced stitchers sew up their opposite ends, the parallelly arranged sections are connected together by the stitches which form them into an endless chain. Thus connected, the connected poultice sections are passed under an endless conveyer 48, mounted upon suitable sprocket heads 49 carried by shafts 50. Said shafts are suitably spaced to constrain the movements of the poultice sections from the end stitchers 46, 46, until, according to the present embodiment of my invention, they are charged into suitable boxes which are presented for this purpose at regularly timed intervals. For this purpose, each of the conveyer links 48 is provided with a projecting lug 51, the succession of these lugs forming suitable recesses for the parallel dental poultices. As said poultices are moved forwardly in connected series, the lateral threads by which they are connected are severed by laterally spaced rotary knives 52 which as shown in Figures 3 and 4 are journalled in the outer ends of vibratory arms 53. Said arms 53 are oscillatably mounted upon a pedestal 54, a shaft 55 having keyed thereto at one end a spur gear 56 and driven thru a bevel gear 57 keyed to its other end. A spur gear 58 meshes with a gear 56 and is keyed to the shaft which carries the rotary cutter 52. It will be understood therefore that as the series of poultice sections pass forwardly, the threads connecting them together are severed as they pass the cutting blades 52, 52.

Referring now to Figures 1, 3, 3ª and 4, the lower run of the endless conveyer 48 travels thru a trough or channel 60 which supports the dental poultices after the cutting blades 52, 52 have severed the connecting threads. Thereafter, each of the dental poultices is propelled along the channel 60 by a lug 51 on the conveyer. Arranged below and reciprocable relatively to the trough 60 is a sliding trough 61 which as shown in Figure 1 is provided with laterally projecting pins 62 journalled in the upper ends 63 of a bifurcated lever by means of which the channelled section 61 is reciprocated. As indicated in Figure 3ª, the lower or reciprocable trough 61 reaches a position in which it projects beyond the upper trough 60 a sufficient distance to overhang a box 66 which is thereupon removed by the next movement of the rotary table 64 which presents another box in position to be charged.

*Packaging mechanism.*

Figures 5, 6, 9, 11:
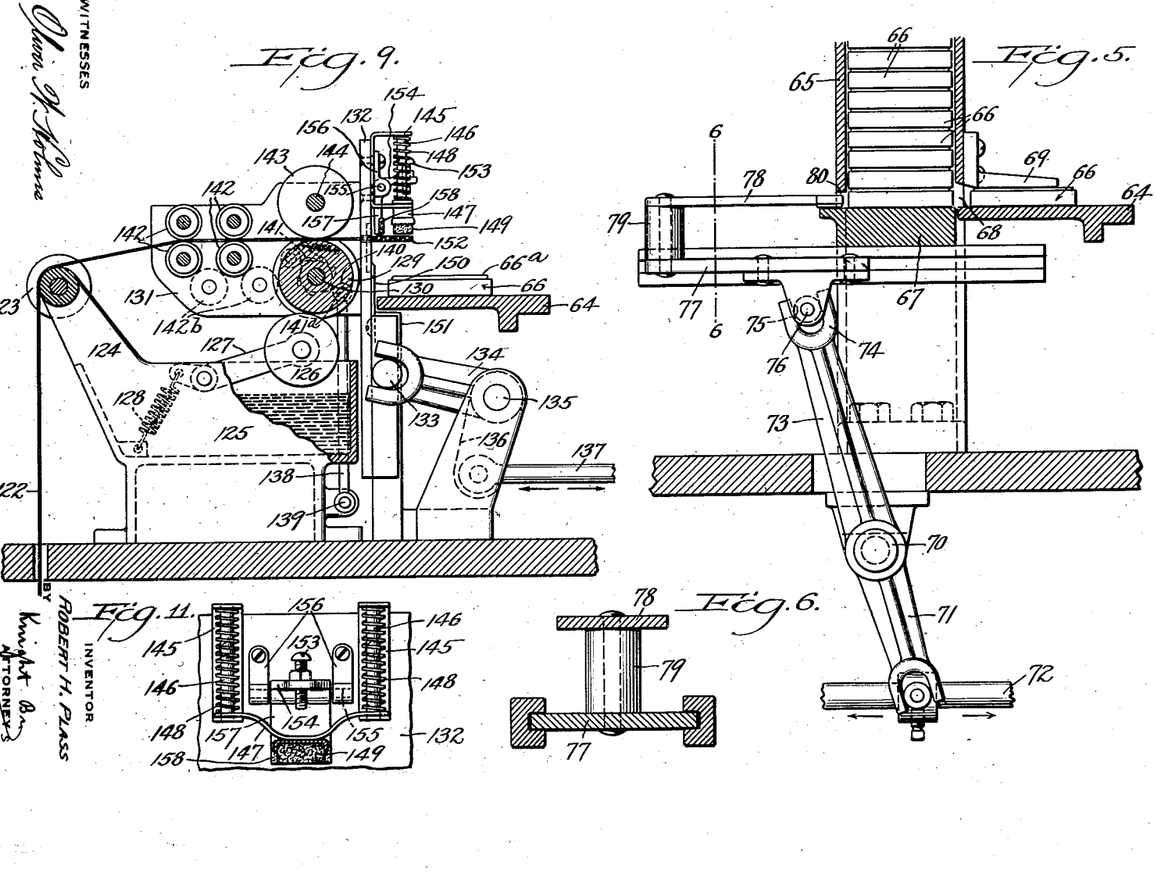
Figure 5 is a side elevation corresponding to the line 5—5, Figure 1 and showing the box-feeding mechanism on an enlarged scale, parts being shown in section.
Figure 6 is a section on the line 6—6, Figure 5.
Figure 9 is an enlarged side elevation corresponding to line 9—9, Figure 1 and showing the box sealing mechanism, parts being broken away and parts shown in section.
Figure 11 is a front elevation on an enlarged scale of parts shown in Figure 9.

Referring now to Figures 1 and 5, a magazine 65 for boxes in inverted position is suitably mounted to project upwardly above the upper surface of the rotary table 64. Said magazine is adapted to receive a stack of boxes 66 supported upon a baseplate 67. At the bottom and adjacent to the periphery of the rotary table 64, the magazine 65 is provided with a discharge outlet 68 above which is arranged a top guide 69 which projects radially inwardly over the rotary plate 64 to confine the box 66 as it is displaced onto the table 64. A rock shaft 70 which is journalled in suitable bearings as shown in Figure 5, is provided with a power arm 71 which is moved to and fro by a reciprocating rod 72. The upwardly presented arm 73 of this lever has a bifurcated upper end 74 in engagement with a roller 75 journalled on a pin 76 carried by a reciprocable slide 77. A pusher 78 is mounted upon a slide 77 by an interposed block 79, said pusher being arranged to reciprocate thru an opening 80 in the outer wall of the hopper 65 for the purpose of displacing the boxes 66 one by one onto the rotary table 64 at each periodic advance of said table. Suitable means for retaining the boxes in position on the rotary table are shown in Figure 1, said means being shown for only one angular position on the rotary table 64 to avoid complicating the illustration. Thus, as shown in Figure 1, a pair of oppositely arranged clamping plates 81 are provided with slots 81ª which permit a limited relative movement with respect to fixed pins 82 which project upwardly from the rotary table 64. Said clamping plates are provided with outwardly presented bevelled guide surfaces 83 so that when the inverted top 66ᵇ of a box is moved forwardly between the chamfered surfaces 83, 83, it will be guided into position between the clamping plates 81, 81, which yield under the pressure of springs 84, 84, which are supported by suitable studs 85, 85. Projecting upwardly and forwardly with respect to the rotary table 64 are a pair of oppositely arranged spring arms 86, 86, which are adapted to yieldably retain the raised inverted bottom of the box when it is lifted in the manner to be hereinafter pointed out. The box having been thus positioned upon the rotary table 64, the next step by step movement of said table brings it into position to have the inverted bottom of the box raised and a folded circular be deposited therein.

*Box opening and circular feeding mechanism.*

Figure 7:
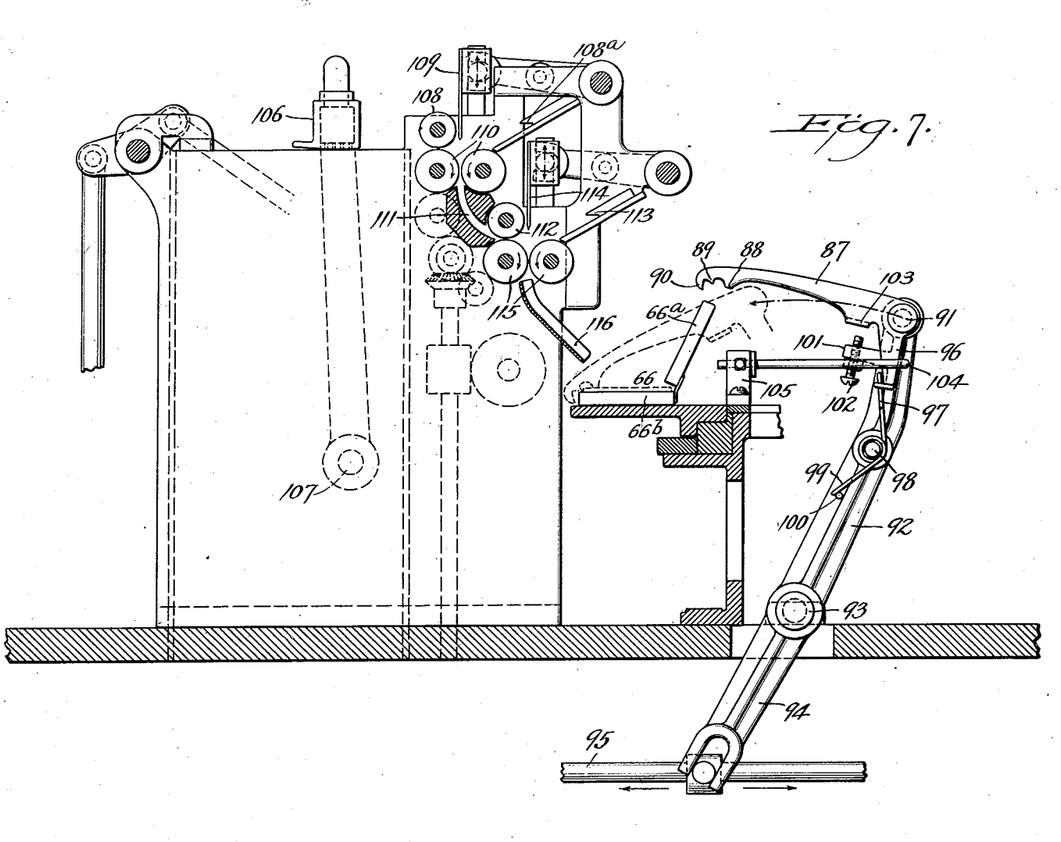
Figure 7 is an enlarged side elevation corresponding to line 7—7, Figure 1 and showing on an enlarged scale, the mechanism for feeding, folding and delivering circulars into the open boxes or containers.

As shown in Figures 1 and 7, after the box has reached the position shown, the inverted bottom 66ª is raised by means of a finger 87 which is provided with a heel 88 adapted to slide over a box in closed position as said finger approaches dotted line position shown in Figure 7. The finger 87 is also provided with a claw 89 adapted to engage the outer corner of the bottom 66ª to raise it after which a spur 90 on the outer end of the finger 87 draws said bottom 66ª forcibly between the yielding clamping fingers 86, 86. For this purpose, the finger 87 is oscillatable about a pin 91 carried by the upper arm 92 of a lever oscillatably mounted upon a pin 93 and provided with a depending arm 94 which is rocked to and fro by a reciprocating rod 95. Said finger 87 is provided with a depending arm 96 against which presses the upper end 97 of a spring coiled about a stud 98 on the lever 92 and having its lower end 99 abutting against a pin 100. Within a lug 101 which is integral with said depending arm 96 is threaded a stop screw 102 adapted to engage the pad 103 on the finger 87 at times when the spring 97 is not resisted by a fixed finger or abutment 104 which engages the depending arm 96 of finger 87 for raising it into full line position shown in Figure 7 at the end of the box opening movement. The finger 104 is mounted in the post 105 adjacent the inner periphery of the rotary table 64. A suction head 106 for feeding off successive circulars from a pile or table is indicated in Figure 7 to be movable to and fro about a shaft 107. Said suction head is thus adapted to present the forward edges of successive circulars to a feed roll 108 of a sheet feeding machine. As a circular is passed under the feed roll 108, its forward edge is intercepted by a front gauge 108ª. Thereupon a folding blade 109 descends to fold the circular between the folding rolls 110, the folded edge being advanced thru the part-circular channel 111 and entering a feed roll 112 to be intercepted by a spur 113. Thereupon the second folding blade 114 imparts a second fold by pressing the once folded circular into the bites of folding rolls 115, the twice folded circular being then discharged thru a chute 16 into the box 66. A circular having been thus advanced within the open box, said box is conveyed by the next movement of the table 64 into position to have the dental poultices charged thereinto as already described.

Box closing mechanism.

Figures 8, 12, 13:
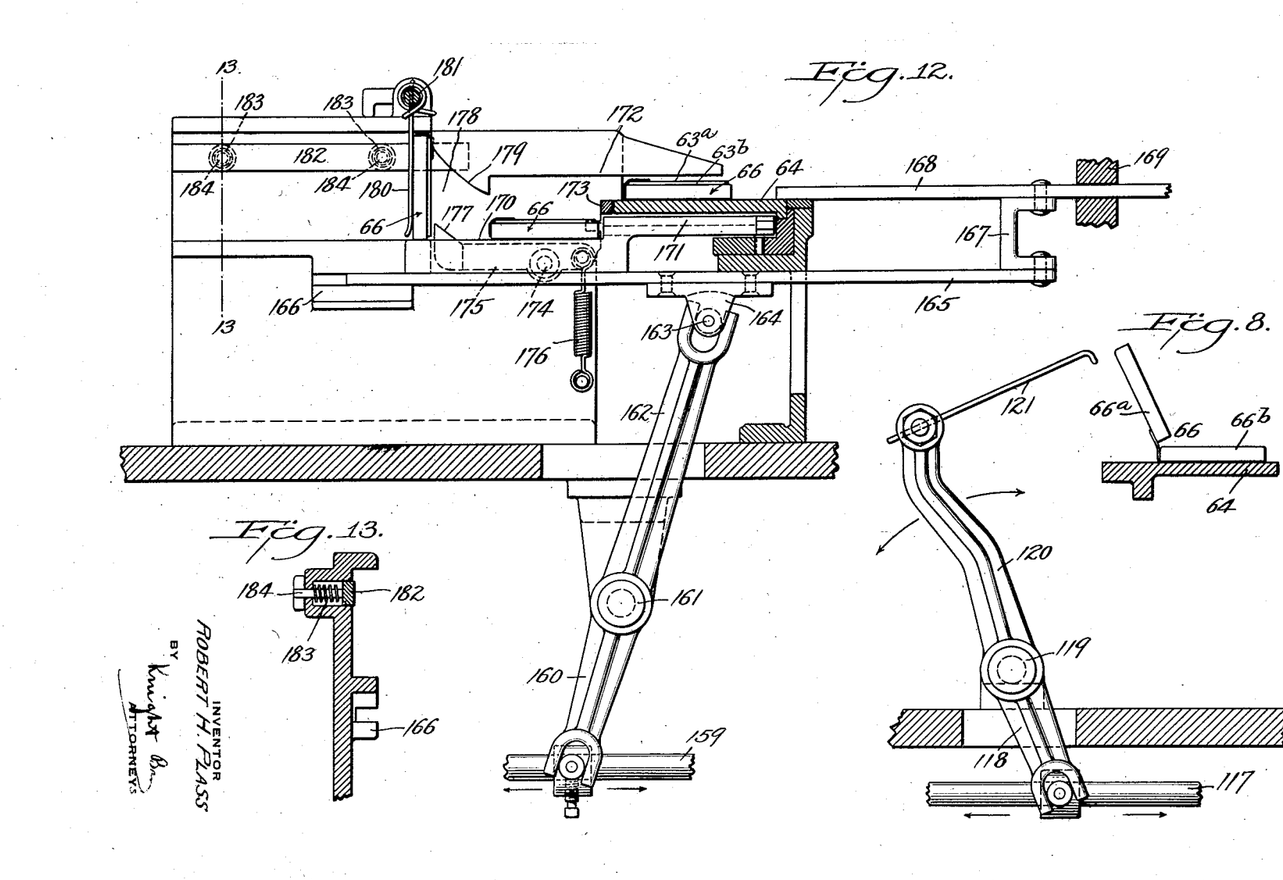
Figure 8 is a side elevation corresponding to the line 8—8, Figure 1 and showing the box closing mechanism on an enlarged scale, parts being broken away and parts shown in section.
Figure 12 is a side elevation corresponding to line 12—12, Figure 1 and showing the box-ejecting mechanism on an enlarged scale, parts being shown in section.
Figure 13 is a section on the line 13—13, Figure 12.

In Figure 8 is shown a reciprocating rod 117 having an operating connection with a depending arm 118 of a lever mounted on a rock shaft 119. The upper arm 120 of said rock lever carries a pusher frame 121 adapted to engage the raised inverted bottom 66$^a$ of the open box and to displace it from the yieldable clamping fingers 86, 86, said bottom portion of the box thereupon dropping to closed position. The next forward movement of the rotary table 64 carries a closed box with its contents to the sealing mechanism in Figures 1 and 9.

Sealing mechanism.

Figure 10:
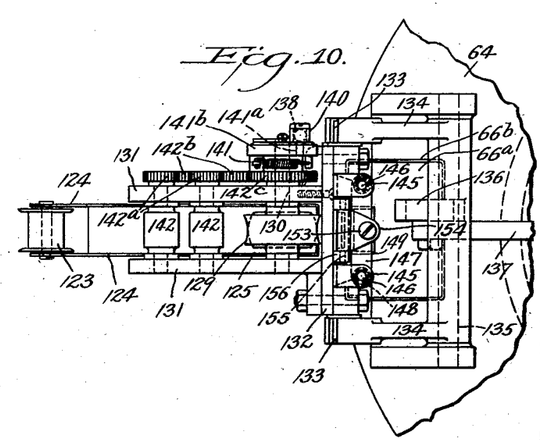
Figure 10 is a top plan view of the same.

According to Figure 9, a strip or web 122 of suitable material passes around a guide pulley 123 journalled in an arm 124 of a glue fountain or tank 125. A fountain roll 126 journalled in an oscillatory arm 127 under tension of a spring 128 which tends to hold said roll 126 in raised position, is adapted to be pressed down into the pot of glue or other adhesive in the fountain 125. Peripherally contacting with the roll 126 is a distributing roll 129 carried by a shaft 130 which is journalled in opposite side frames 131 carried by a vertical reciprocatory slide or frame 132. A stub shaft 133 carried by the lower end of the slide 132 is operatably engaged by the bifurcated outer end of an oscillatory frame 134 keyed to the rock shaft 135, said rock shaft being provided with a rock arm 136 driven by a reciprocating rod 137. As the side frames 131 rise and fall, a pitman 138 which is pivoted below at 139, imparts a step by step movement to the distributing roll 129. For this purpose, the upper end 140 of the pitman 138, is pivotally connected to a wrist pin 141$^a$ (see Figure 10) which projects from a disk 141$^b$, said disk being freely journalled on the shaft 130 which carries the distributing roll 129. A pawl 141 on the disk 141$^b$ operates on a ratchet (shown in dotted lines in Figure 9), said ratchet being keyed to the shaft 130. Suitable tape-feed rolls 142 are provided with gears 142$^a$ which by means of idlers 142$^b$ are geared together and connected to a spur gear 142$^c$, keyed to the shaft 130. The tape or web 122 has thus imparted thereto, a step by step movement while at the same time a coating of adhesive is being applied to the under surface thereof by means of distributing roll 129. During this application of adhesive, the tape or web is pressed down onto the distributing roll 129 by means of a complementary roll 143. Rigidly mounted upon the upper end of slide 132 as shown in Figures 9 and 10 are a pair of laterally spaced U-shaped frames 145, 145. A vertical rod 146 is mounted in the oppositely arranged horizontal arms of each of the U-frames 145, said rods serving as guides for a bow shaped band 147 (see Figure 11), the oppositely presented ends of said band being slidably mounted upon the rods 146, 146. Compression springs 148, 148, are arranged between the upper horizontal arm of each U-shaped frame and the ends of bow shaped band 147. These springs operate to normally maintain the band 147 in depressed position. A downwardly presented pressure pad 149 is mounted on the depressed intermediate portion of the band 147 and when the slide 132 drops is adapted to press down upon the inverted bottom 66$^a$ of the closed box, a severed portion of the web 122 having been interposed between it and said box. For this purpose, a knife or cutter 150 is mounted upon the guides 151 in such a position that when the web guides 152 move downwardly with the web 122, said web is drawn across the cutting plate 150 and thereby severed. As soon as the pad 149 is brought to a stop by the box 66, springs 148, 148 are compressed, permitting the band 147 to be arrested in its downward movement without interrupting its continuing downward movement of sliding. As a result an adjustable screw 153 is brought into engagement with the depressed portion of the band 147. A screw 153 is carried by the horizontal arm 154 of a bell crank lever mounted on a pintle 155, said pintle being carried by suitable bearing sockets 156, 156, which are secured to the slide 132. A depending arm 157 of said bell crank is provided with a pad 158 which is adapted to depress the overhanging edge of the sealing web portion downwardly along the lateral edge of the box 66. The upward displacement of screw 153 toward the end of the downward movement of slide 132, serves to move the pad 158 laterally towards the box 66, thus completing the sealing operation. The package thus sealed is conveyed to the discharge conveyer or ejector which will now be described.

Package ejecting mechanism.

As shown in Figure 12, a reciprocating rod 159 has an operating connection with a depending arm 160 of a rock lever oscillatable on a rock shaft 161. The upwardly presented arm 162 of said rock lever has an operating connection with a pin 163 carried by a bracket 164 on the under surface of a bar 165, said bar being reciprocably mounted in a guide 166. A double angle block 167 rigidly secured to the bar 165, is rigidly connected above to a slide or ejector member 168 which reciprocates in a guide 169. Said slide 168 is suitably arranged to traverse on the upper surface of the rotary table 64 in a radial direction so as to displace the sealed package 66 outwardly during the anti-clockwise movement of the lever 160, 162. Mounted upon the outer end of the reciprocatory bar 165 is a lower box supporting platen 170 and an inner or upper box supporting platen 171. It will be understood that when the slide 168 moves toward the left in Figure 12, it will displace the box 66 under the overhanging guide 172 and onto the raised box supporting platen 171 which is simultaneously moved outwardly from under rotary table 64. Upon the next movement of the slide 168 toward the right, the box 66 will be intercepted by a guard 173 so that when the platen 171 has been again retracted to its position below the rotary table 64, said box 66 will be permitted to drop onto the lower platen 170. A pin 174 mounted in the frame of the machine, pivotally supports a latch 175 which is normally held in position shown in Figure 12 by a coil spring 176. An inclined surface 177 on the outer extremity of the latch 175 serves to deflect upwardly the forward edge of box 66 on the next anti-clockwise movement of the rock shaft 161. The box 66 thus propelled will be shifted angularly as it passes upwardly thru the opening 178 between the surface 177 and an upper guide surface 179. During this movement, the forward edge of the first presented box 66 will come into engagement with the depending guards 180 which are carried by a cross-rod 181. As the lower edge of the box 66 comes into engagement with the inclined surface 177, the outer end of latch 175 is depressed and the package 66 assumes the upright position shown to the left of Figure 12. As successive packages 66 are forced upwardly thru the throat 178 the guard 180 will be raised to a horizontal position while the packages 66 will be arranged in a column in lateral engagement with a guide bar 182 which as shown in Figure 13 is pressed yieldably against the packages 66 by means of compression springs 183, 183, which extend around the spring rods 184, 184, which are carried by the guide bar 182.

I claim:—

1. In a machine of the character described, the combination with a pair of forming rolls, of means for supplying a continuous supply of wrapper-forming material to said forming rolls, means for supplying a continuous supply of filler material to be enclosed by said wrapper material as said materials are passed thru said forming rolls, means for securing said wrapper material around said filler to form a continuous stock of wrapped filler, means for severing successive portions from said continuous stock, and means for closing and securing the open severed ends of each of said severed portions to form completely closed units.

2. In a machine of the character described, means for supplying continuous bottom and top wrapper tapes, pressure-rolls between which said tapes travel, means for introducing a continuous filler between said wrapper tapes as they approach said pressure rolls, means for securing the opposite lateral edges of said tapes together as they leave said pressure rolls, means for severing successive portions from the continuous wrapped filler thus produced, and means for securing the ends of said severed portions.

3. In a machine of the character described, the combination with a hopper provided with a downwardly discharging throat, of a tapered screw conveyer having its larger end arranged to receive material thru said throat, forming rolls arranged at the smaller end of said tapered screw conveyer, tape-guides terminating adjacent said forming rolls, said forming rolls being adapted to shape the filler material between tapes which pass from said tape-guides between said rolls, and stitching mechanism adapted to stitch together the lateral edges of said tapes.

4. In a machine of the character described, the combination with stock-forming rolls, of means for supplying upper and lower wrapper tapes to said forming rolls, means for feeding a filler between said tapes, means for securing the lateral edges of said tapes together, continuously rotating feed rolls operating upon the continuous wrapped filler thus formed, intermittently rotating feed rolls spaced therefrom, means interposed between said continuously rotating feed rolls and said intermittently rotating feed rolls for taking up slack in said wrapped filler, and a knife operable during the rest periods of said intermittently rotatable feed rolls for severing protruding portions of said continuous wrapped filler.

5. In a machine of the character described, the combination with a downwardly-discharging hopper, of a pair of forming rolls, means for supplying continuous upper and lower tapes to said forming rolls, a conveyer receiving material in a loose condition from said hopper and discharging said filler in a compressed condition between said tapes as they pass between said forming rolls, stitching mechanism adapted to stitch together the lateral edges of said upper and lower tapes, and means for severing protruding portions of said continuous wrapped filler.

6. In a machine of the character described, the combination with a hopper provided with a downwardly discharging throat, of a tapered screw conveyer having its larger end arranged to receive material thru said throat, forming rolls arranged at the smaller end of said tapered screw conveyer, tape-guides terminating adjacent said forming rolls, said forming rolls being adapted to shape the filler material between tapes which pass from said tape-guides between said rolls, stitching mechanism adapted to stitch together the lateral edges of said tapes, continuously rotating feed rolls operating upon the continuous wrapped filler thus formed, intermittently rotating feed rolls spaced therefrom, means interposed between said continuously rotating feed rolls and said intermittently rotating fed rolls for taking up slack in said wrapped filler, and a knife operable during the rest periods of said intermittently rotatable feed rolls for severing protruding portions of said continuous wrapped filler.

7. In a machine of the character described, the combination with means for forming a continuous wrapped filler, of means for severing successive portions therefrom, means for feeding said continuous wrapped filler to said severing means, a suction device provided with port-openings, means for moving a severed portion into position to present the open ends thereof adjacent to said port-openings, means for tapping the ends of said severed portion for loosening the material adjacent said ends to be drawn off by said suction device, and means for closing and securing the wrapper ends.

8. In a machine of the character described, the combination with means for severing successive portions from a continuous wrapped filler, of a suction device provided with oppositely-disposed port-openings, means for moving a severed portion into position with its open ends presented to said port-openings, means for tapping the ends of said severed portion to loosen portions of the material therein to be drawn off by said suction device, a sewing machine provided with laterally spaced needles, and means for feeding the severed portions from said suction device and presenting them broadside to said needles for stitching shut the open ends of said severed portions.

9. In a machine of the character described, the combination with means for forming a continuous wrapped filler, of means for severing successive portions therefrom, intermittently operating means for feeding said continuous wrapped filler to said severing means, a suction device provided with oppositely-disposed port-openings, means for moving a severed portion into position with its open ends presented to said port-openings, means for tapping the ends of said severed portion for loosening portions of said filler to be drawn off by said suction device, and means for stitching the opposite ends of said severed portion.

10. In a machine of the character described, the combination with means for forming a continuous wrapped filler, of means for severing successive portions therefrom, intermittently operating means for feeding said continuous wrapped filler to said severing means, a suction device provided with oppositely-disposed port-openings, means for moving a severed portion into position with its open ends presented to said port-openings, a vibrator provided with spaced branches adapted to tap the ends of said severed portion, a stitching device adapted to stitch the opposite ends of said portion, and means for feeding said severed portion broadside on to said stitching device.

11. In a machine of the character described, the combination with means for forming an endless wrapper, of means for feeding a continuous filler to said endless wrapper, means for severing successive portions from the filled wrapper, thus formed, and means for sewing together the opposite edges of the ends of the severed wrapper portions and connecting said severed wrapper portions together in parallel arrangement.

12. In a machine of the character described, means for feeding an endless wrapper, means for supplying a filler thereto, means for securing the wrapper longitudinally to enclose a continuous core of said filler, means for severing successive portions from the filled wrapper and arranging them parallel in a series, means for securing the opposite ends of said portions and connecting them together in parallel, and means for severing said portions one at a time from the continuously connected series.

13. In a machine of the character described, the combination with a reciprocatory slide, of a rotary knife journaled in said slide, means for feeding a continuous stock of wrapped filler into the reciprocatory path of said rotary knife, means for removing loosened material from the ends of the severed portions, and means for closing and securing the ends of the wrapper portions.

14. In a machine of the character described, the combination with a reciprocatory slide, of a rotary knife journaled in said slide, means for feeding a continuous stock of wrapped filler into the reciprocatory path of said rotary knife, a suction device provided with port-openings presented towards each other and spaced apart a distance substantially equal to the length of the portions severed from said continuous stock, a reciprocatory pusher for moving successive severed portions into position with their severed ends in register with said port-openings, a vibrator movable in a plane including the common axis of said port-openings, said vibrator having branches respectively arranged to tap the ends of said portions, and means for closing the ends of said portions.

15. In a machine of the character described, the combination with paired forming rolls, of means for supplying wrapper-forming material to said forming rolls, a tapered screw conveyor having its smaller end presented toward said forming rolls for continuously supplying filler to said forming rolls to be enclosed in said material, means for securing the wrapper-forming material around the continuous filler, and means for severing successive sections from the wrapped filler stock thus formed.

16. In a machine of the character described, the combination with a reciprocatory slide, of a rotary knife journaled in said slide, means for feeding a continuous stock of wrapped filler into the path of said rotary knife, a suction device provided with port-openings presented towards each other and spaced apart a distance substantially equal to the length of the portions severed from said continuous stock, a reciprocatory pusher for moving successive severed portions into position with their severed ends in register with said port-openings, a vibrator movable in a plane including the common axis of said port-openings, said vibrator having branches respectively arranged to tap the ends of said severed portions, a sewing machine provided with laterally spaced needles for stitching the ends of said severed portions and connecting them into a chain, means for conveying the severed portions from said suction device to said sewing machine, an endless conveyer having projecting lugs for engaging said enchained portions for feeding them forward, and oppositely arranged rotary knives oscillatable about axes distant from their rotary axes for severing successive stock-portions from said chain.

17. In a poultice-making machine, the combination with means for supplying upper and lower wrapper tapes, of a conveyer for feeding poultice-material between said tapes, a hopper discharging to said conveyer, stitchers for securing the lateral edges of said tapes together, means for severing successive portions from the continuous poultice thus formed, and stitchers for closing the open ends of said portions.

18. In a machine of the character described, the combination with means for supplying an endless wrapper, of a hopper arranged to discharge to a wrapper supplied by said wrapper-supply means to form a continuous filled wrapper, means for severing successive portions from the filled wrapper and arranging them parallel in a series, means for stitching the opposite ends of said portions and connecting them together in transverse order, and means adapted to engage and propel said connected portions in a continuing chain.

19. In a machine of the character described, the combination with means for forming a continuous tubular wrapper, of means for continuously filling said tubular wrapper with material, means for severing successive sections from the continuous stock thus formed, means for stitching the opposite ends of the severed sections as said sections are presented thereto, means for feeding said severed sections broadside on from said severing means to said stitching means, said stitching means being adapted to connect said sections in a series, a conveyor adapted to engage said sections and by means of the stitched connections between said sections to drag them into position to be engaged by said conveyor, and means for cutting the connecting stitches between successive sections.

20. In a machine of the character described, the combination with means for supplying upper and lower continuous wrapper-forming tapes, of means for continuously supplying a filler between said upper and lower tapes, means for securing the lateral edges of said tapes together, continuously-operating feed rolls operating upon the completed stock thus formed, intermittently operated feed rolls operating upon said stock after it leaves said continuously-operating feed rolls, a slack take-up device operating upon said stock between the continuously-operating and intermittently-operating feed rolls, and means for severing successive portions of said stock presented beyond said intermittently-operating feed rolls.

21. In a machine of the character described, the combination with paired forming rolls, of means for supplying upper and lower continuous wrapper-forming tapes to said forming rolls, a tapered screw conveyor having its smaller end presented toward said forming rolls for continuously supplying a filler between said upper and lower tapes as they pass between said rolls, means for securing the lateral edges of said tapes together as they move away from said rolls, continuously-operating feed rolls operating upon the completed stock thus formed, intermittently operated feed rolls operating upon said stock after it leaves said continuously-operating feed rolls, and means for severing successive portions of said stock presented beyond said intermittently-operating feed rolls.

22. In a machine of the character described, the combination with means for forming a continuous tubular wrapper, of means for continuously charging filler material into said tubular wrapper, means for severing successive sections from said filled continuous tubular wrapper, means for removing portions of the filler from the ends of said sections, and means for stitching the ends of said sections to completely close said sections.

23. In a machine of the character described, means for forming a continuous stock, means for severing successive sections therefrom, means for stitching the opposite ends of the severed sections together in series, a conveyor provided with lugs adapted to engage and to propel said connected units and by means of the connections between said units to drag said units from said stitching means into position to be engaged by said lugs, and means for severing the connecting stitches between successive sections after said sections are engaged by said lugs.

24. In a machine of the character described, the combination with means for forming a continuous tubular wrapper, of means for continuously charging filler material into said tubular wrapper, means movable across the path of the filled continuous tubular wrapper for severing successive sections therefrom, means for tapping the severed ends of said sections to loosen portions of the filler therein, means for removing the loosened portions of the filler from the ends of said sections, and means for stitching the ends of said sections to completely close said sections.

25. In a machine of the character described, means for forming a continuous stock of wrapped material, means for severing successive sections therefrom, means for closing the opposite ends of the severed sections and for connecting said units together in series, a conveyor provided with lugs adapted to engage and to propel said connected units and by means of the connections between said units to drag said units from said stitching means into position to be engaged by said lugs, and means movable transversely to the path of said lugs for severing the connections between successive sections after said sections are engaged by said lugs.

26. In a machine of the character described, the combination with means for forming a continuous tubular wrapper, of means for continuously charging filler material into said tubular wrapper, a knife movable across the path of the filled continuous tubular wrapper for severing successive sections therefrom, means for tapping the severed ends of said sections to loosen portions of the filler therein, a suction device for removing the loosened portions of the filler from the ends of said sections, and means for stitching the ends of said sections to completely close said sections.

27. In a machine of the character described, means for forming a continuous stock of wrapped material, means for severing successive sections therefrom, means for stitching the opposite ends of the severed sections to form completely closed units and for connecting said units together in series, a conveyor provided with lugs adapted to engage and to propel said connected units and by means of the connections between said units to drag said units from said stitching means into position to be engaged by said lugs, oscillatory knives arranged on opposite sides the path of said connected sections, and means for operating said knives to sever the connecting stitches between successive sections after said sections are engaged by said lugs.

ROBERT H. PLASS.